United States Patent
Chung et al.

(10) Patent No.: US 11,521,386 B2
(45) Date of Patent: Dec. 6, 2022

(54) SYSTEMS AND METHODS FOR PREDICTING VIDEO QUALITY BASED ON OBJECTIVES OF VIDEO PRODUCER

(71) Applicant: Meta Platforms, Inc., Menlo Park, CA (US)

(72) Inventors: Wook Jin Chung, San Carlos, CA (US); Ziheng Wang, San Jose, CA (US); Allen Yang Liu, Sammamish, WA (US); Joyce Marie Hodel, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 317 days.

(21) Appl. No.: 16/523,667

(22) Filed: Jul. 26, 2019

(65) Prior Publication Data

US 2021/0027065 A1    Jan. 28, 2021

(51) Int. Cl.
*G06V 20/40* (2022.01)
*G06K 9/62* (2022.01)
*G06T 7/00* (2017.01)
*G06N 20/00* (2019.01)
*G06N 3/08* (2006.01)

(52) U.S. Cl.
CPC ........... *G06V 20/41* (2022.01); *G06K 9/6256* (2013.01); *G06N 3/08* (2013.01); *G06N 20/00* (2019.01); *G06T 7/0002* (2013.01); *G06T 2207/10016* (2013.01); *G06T 2207/20081* (2013.01); *G06T 2207/20084* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 8,260,117 B1* | 9/2012 | Xu | ..... | H04N 21/4668 386/343 |
| 2011/0218948 A1* | 9/2011 | De Souza | ..... | G06N 20/00 706/12 |
| 2011/0320261 A1* | 12/2011 | Kadambi | ..... | G06Q 30/02 705/14.42 |
| 2016/0292722 A1* | 10/2016 | Myers | ..... | G06Q 30/0243 |
| 2016/0328384 A1* | 11/2016 | Divakaran | ..... | G06F 40/211 |
| 2017/0061286 A1* | 3/2017 | Kumar | ..... | G06Q 30/0269 |
| 2018/0096251 A1* | 4/2018 | Dinu | ..... | G06F 3/0482 |
| 2020/0021873 A1* | 1/2020 | Swaminathan | ..... | G06N 3/08 |
| 2021/0110831 A1* | 4/2021 | Shillingford | ..... | G06V 40/171 |

* cited by examiner

*Primary Examiner* — Leon Viet Q Nguyen
(74) *Attorney, Agent, or Firm* — Sheppard Mullin Richter & Hampton LLP (57) ABSTRACT

Systems, methods, and non-transitory computer-readable media can collect a set of training videos as training data, wherein the set of training videos are labeled with one or more labels based on one or more video quality metrics associated with an evaluation objective. A machine learning model is trained based on the training data. A video to be evaluated is received. The video is assigned to a first video quality category of a plurality of video quality categories based on the machine learning model.

20 Claims, 7 Drawing Sheets

| Post | Status | Retention Prediction |
|---|---|---|
| New Recipes<br>Webpage: Cool Foods | Draft | Excellent |
| Favorite Summer Citrus<br>Webpage: Fruity Recipes | Draft | Good |
| Favorite No Heat Recipes<br>Webpage: Traveling Food | Draft | Fair |
| Pasta and Seasonal Veggie Pairings<br>Webpage: Cool Foods | Draft | Poor |
| Chocolate Treats from Portland<br>Webpage: Cool Foods | Posted | Excellent |

```
┌─────────────────────────────────────────────────────────────────────┐
│ Collect a set of training videos as training data, wherein the set  │
│ of training videos are labeled with one or more labels based on one │
│ or more video quality metrics associated with an evaluation         │
│ objective                                                           │
│ 402                                                                 │
└─────────────────────────────────────────────────────────────────────┘
                                   │
                                   ▼
┌─────────────────────────────────────────────────────────────────────┐
│ Train a machine learning model based on the training data           │
│ 404                                                                 │
└─────────────────────────────────────────────────────────────────────┘
                                   │
                                   ▼
┌─────────────────────────────────────────────────────────────────────┐
│ Receive a video to be evaluated                                     │
│ 406                                                                 │
└─────────────────────────────────────────────────────────────────────┘
                                   │
                                   ▼
┌─────────────────────────────────────────────────────────────────────┐
│ Assign the video to a first video quality category of a plurality   │
│ of video quality categories based on the machine learning model     │
│ 408                                                                 │
└─────────────────────────────────────────────────────────────────────┘
```

SYSTEMS AND METHODS FOR PREDICTING VIDEO QUALITY BASED ON OBJECTIVES OF VIDEO PRODUCER

FIELD OF THE INVENTION

The present technology relates to the field of automated content generation and evaluation. More particularly, the present technology relates to techniques for automatically generating machine learning models to evaluate digital content based on objectives of video producers.

BACKGROUND

Today, people often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social networking system for consumption by others.

Under conventional approaches, users may post various content items to a content sharing system, such as a social networking system. Users, such as publishers of video, may post content for presentation through the content sharing system to various audiences. Although they may strive to offer content that is well received by their targeted audiences, publishers face significant uncertainty about the popularity of their offerings before publication.

SUMMARY

Various embodiments of the present technology can include systems, methods, and non-transitory computer readable media configured to collect a set of training videos as training data, wherein the set of training videos are labeled with one or more labels based on one or more video quality metrics associated with an evaluation objective. A machine learning model is trained based on the training data. A video to be evaluated is received. The video is assigned to a first video quality category of a plurality of video quality categories based on the machine learning model.

In an embodiment, the video quality metric pertains to viewer retention time.

In an embodiment, collecting the set of training videos comprises: collecting a first set of training videos from a first set of pages of a social networking system.

In an embodiment, collecting the set of training videos further comprises: identifying a second set of pages of the social networking system that are similar to the first set of pages, and collecting a second set of training videos from the second set of pages.

In an embodiment, the second set of pages are identified based on a second machine learning model.

In an embodiment, the machine learning model is a multi-stage model comprising a deep neural network and a sparse neural network.

In an embodiment, the deep neural network is configured to receive image and sound data associated with the video, and generate a vector representation of the video.

In an embodiment, the sparse neural network model is configured to receive metadata associated with the video and the vector representation of the video generated by the deep neural network, and generate respective likelihood scores corresponding to each of the plurality of video quality categories.

In an embodiment, the video is assigned to the first video quality category of the plurality of video quality categories based on the first video quality category having a highest likelihood score of the plurality of video quality categories.

In an embodiment, collecting the set of training videos comprises filtering out one or more videos from the set of training videos based on filtering criteria, wherein the filtering criteria comprise a minimum length threshold.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Automated Content Evaluation

People often utilize computing devices (or systems) for a wide variety of purposes. Users can use their computing devices to, for example, interact with one another, access content, share content, and create content. In some cases, content items can include postings from members of a social networking system. The postings may include text and media content items, such as images, videos, and audio. The postings may be published to the social networking system for consumption by others.

Under conventional approaches, users may post various content items to a content sharing system, such as a social networking system. Users, such as publishers of video, may post content for presentation through the content sharing system to various audiences. Although they may strive to offer content that is well received by their targeted audiences, publishers face significant uncertainty about the popularity of their offerings before publication.

Video publishers of a content sharing system, such as a social networking system, may post content about various topics for consumption by viewers. For example, video publishers may share content items about family, current events, politics, sports, food, or other topics. Due to the abundance of available content, viewers often make quick decisions about whether to watch one content item or whether to skip to other content items. For example, viewers may decide whether or not to continue viewing a video during the initial 10 seconds, 20 seconds, or one minute of the video. As such, the content of the initial portion of a video may be critical to the success of a video published on the content sharing system. However, video publishers or other content providers may lack guidance or understanding about how to create content that will be of interest to users. As a result, uninteresting content can undesirably proliferate on a content sharing platform. Such proliferation of uninteresting content can frustrate viewers and undesirably result in poor user experience. Conventional approaches may not be effective in addressing these and other problems arising in computer technology.

An improved approach rooted in computer technology overcomes the foregoing and other disadvantages associated with conventional approaches specifically arising in the realm of computer technology. In general, one or more machine learning models can be trained to predict video quality for a video that is provided as input. Video producers can, for example, utilize the one or more machine learning models to analyze their videos to determine whether or not the videos are of a sufficiently high quality before publishing the videos. In certain embodiments, training data for training the one or more machine learning models can be automatically collected, and the machine learning models can be automatically trained based on the collected training data.

In an embodiment, a machine learning model can be trained to determine a video quality score (or rating) for a video and/or to categorize a video into one video quality category of a plurality of video quality categories based on one or more identified objectives pertaining to video quality. For example, one objective may be to maximize viewer retention time (e.g., viewer retention time may be an indicator of video quality). A set of videos can be automatically selected as training data to train a machine learning model based on selection criteria associated with the identified objectives. Using the training data, the machine learning model can be trained to assign a video to a video quality category or to determine a video quality level (or score) for the video based on various video characteristics. The video quality level and/or category may be indicative of a likelihood of the video to achieve the identified objective (e.g., likelihood of the video to exceed a threshold viewer retention time). Video producers can, for example, utilize the trained machine learning model to analyze their own videos before publishing them. If a video has a low video quality level (or is assigned to a video quality category indicative of a low video quality level), that may indicate that the video needs to be changed in some way before publishing, whereas a higher video quality level may indicate that the video is ready for publishing. Multiple machine learning models can be trained for different objectives. Using the disclosed technology, a video publisher can take advantage of a machine learning model that has been trained based on the collective past behavior of a set of users to predict whether or not their video will be successful. More details relating to the disclosed technology are provided below.

Figure 1:
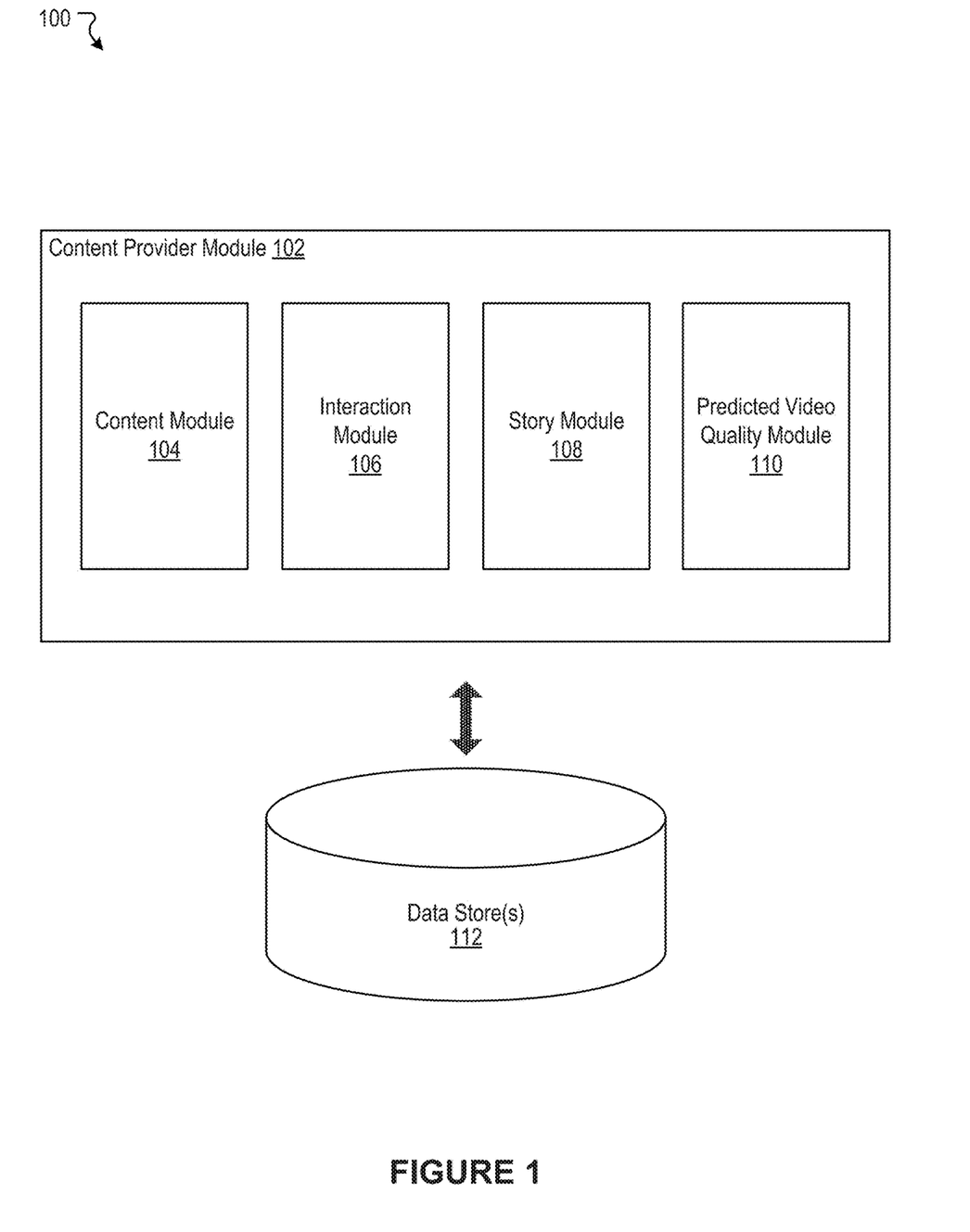
FIG. 1 illustrates an example system including a content provider module, according to an embodiment of the present technology.

FIG. 1 illustrates an example system 100 including a content provider module 102, according to an embodiment of the present technology. As shown in the example of FIG. 1, the content provider module 102 can include a content module 104, an interaction module 106, a story module 108, and a predicted video quality module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 can be implemented in any suitable combinations.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be, in part or in whole, implemented as software running on one or more computing devices or systems, such as on a server system or a client computing device. In some instances, the content provider module 102 can be, in part or in whole, implemented within or configured to operate in conjunction with or be integrated with a social networking system (or service), such as a social networking system 630 of FIG. 6. Likewise, in some instances, the content provider module 102 can be, in part or in whole, implemented within or configured to operate in conjunction with or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 112, as shown in the example system 100. The data store 112 can be configured to store and maintain various types of data. In some implementations, the data store 112 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some implementations, the data store 112 can store information utilized by the content provider module 102. For example, the data store 112 can store training data for training one or more machine learning models, one or more trained machine learning models, one or more videos to be evaluated by the trained machine learning models, and the like.

The content provider module 102 can be configured to provide users with access to interact with a social networking system. For example, the content module 104 can provide users an interface to post content items to the social networking system. Such content items may include text, images, audio, videos, and live content streams, for example. In some embodiments, the interface can be provided by a software application (e.g., a social networking application, browser, etc.) running on a computing device of a user. The content module 104 can also provide users with access to posted content items. In some embodiments, the content module 104 can automatically identify (or curate) content items to be shown to a given user. For example, the content module 104 can receive content items to be posted and can perform classification analyses to determine topics (or subject matter) reflected by the content items. The classification analyses performed by the content module 104 on content items, such as images or text, can be based on any suitable processing techniques. For example, with respect to images, an image classifier can be trained to determine the subject matter reflected by an image. As another example, with respect to text, topic tagging can use contextual information surrounding a content item to determine topics reflected by the content item. The contextual information can be used to infer topics reflected by the content item. Other suitable techniques to determine topics reflected by content items can be used. For example, tags or hashtags associated with a content item can be used to determine related topics. The content module 104 can select content items for presentation to a user based on interests of the user. In some embodiments, the content module 104 can be implemented as a content feed managed by the social networking system that can select content items (or stories) for presentation to a user. In one embodiment, the content module 104 can train (and retrain) machine learning models for ranking content items for potential presentation in content feeds of users of the social networking system. As just one example, the content module 104 can divide its users into different sets based on various attributes of the users (e.g., age, ethnicity, income, language, etc.) and can generate one or more models for each set of users. Users with different attributes may have different behavioral patterns that can reflect their interests in different topics reflected by content items. As a result, different models for ranking content items for different sets of users can provide more accurate ranking of content items and provide higher likelihood that users will be interested in the topics reflected by the content items presented to them. Features used to train the models can include interactions of users with content items of a content feed. Such interactions can include, for example, selecting a link in the content item, commenting on the content item, liking or otherwise expressing a sentiment reaction in relation to the content item, sharing the content item, hiding the content item, etc. The content module 104 can use the models to determine levels of interest of a user in topics reflected by content items. The social networking system can rank a content item for potential presentation to a user based on a topic(s) reflected by the content item and the level of interest of the user in the topic(s). Content items having a ranking that satisfies a selected threshold value can be presented to the user in his or her content feed.

The content provider module 102 can also provide users with options for interacting with individual content items. For example, a user may want to endorse, or "like", a content item. In such instances, the user can select an option to like the content item. The interaction module 106 can determine when a user likes a given content item and can store information describing this relationship. In some instances, a user may want to post a comment in response to a content item. In such instances, the user can select an option to enter and post the comment for a desired content item. The interaction module 106 can determine when a user posts a comment in response to a given content item and can store information describing this relationship. In some instances, a user may want to share a content item. In such instances, the user can select an option to share the content item, for example, through a content feed. The interaction module 106 can determine when a user shares a given content item and can store information describing this relationship. In some embodiments, such information can be stored in a social graph as described in reference to FIG. 6.

The content provider module 102 can also provide users with options for posting ephemeral or temporary content. In some embodiments, the story module 108 can provide an option that allows users to post their content as stories. In such embodiments, each user has a corresponding story feed in which the user can post content. When a user's story feed is accessed by another user, the story module 108 can provide content posted in the story feed to the other user for viewing. In general, content posted in a user's story feed may be accessible by any user of the social networking system. In some embodiments, content posted in a user's story feed may only be accessible to connections of the user on the social networking system. In some embodiments, user stories expire after a pre-defined time interval (e.g., after 24 hours). In such embodiments, content posted as a story in a story feed is treated as ephemeral content that is made inaccessible once the pre-defined time interval has elapsed. In contrast, content posted in a user (or follower) primary content feed can be treated as non-ephemeral content that remains accessible for a longer and/or an indefinite period of time.

In various embodiments, the predicted video quality module 110 can be configured to predict the quality of a video (e.g., a video quality level, a video quality score, a video quality category, etc.) based on one or more machine learning models. In certain embodiments, the predicted video quality module 110 can train a machine learning model to receive a video as an input, and to determine a quality level or quality score (or rating) for that video. In an embodiment, the machine learning model can be trained to receive a video as an input, and to assign the video to a particular video quality category of a pre-defined set of video quality categories (e.g., poor, fair, good, excellent, etc.). More details regarding the predicted video quality module 110 will be provided below with reference to FIG. 2.

Figure 2:
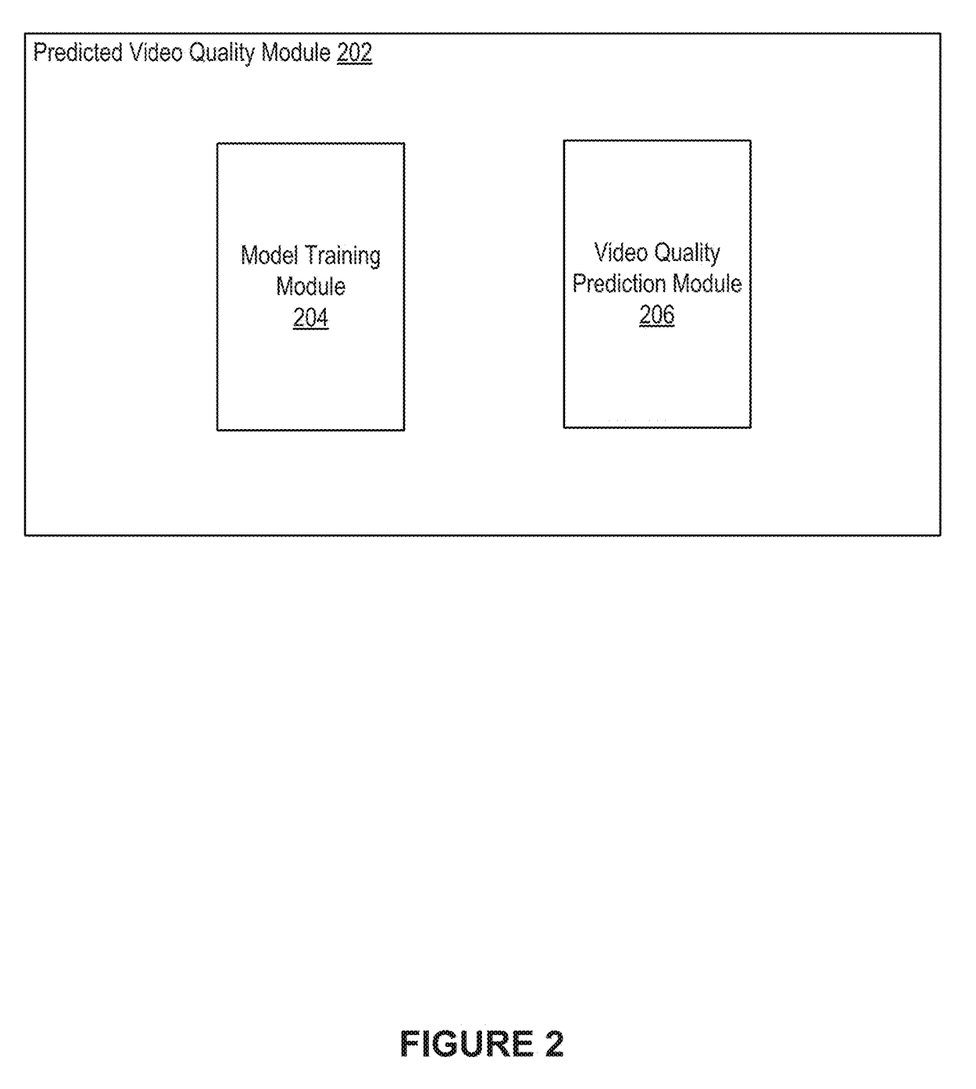
FIG. 2 illustrates an example predicted video quality module, according to an embodiment of the present technology.

FIG. 2 illustrates an example predicted video quality module 202 according to an embodiment of the present technology. In some embodiments, the predicted video quality module 110 of FIG. 1 can be implemented as the predicted video quality module 202. As shown in the example of FIG. 2, the predicted video quality module 202 can include a model training module 204 and a video quality prediction module 206.

The model training module 204 can be configured to train a machine learning model using training data. In various embodiments, the training data can include a set of training videos. Each video of the set of training videos can be associated with a set of video features. In certain embodiments, the set of video features can include, among other features, any combination of the following: a vertical and/or a sub-vertical associated with the video (e.g., cooking video, travel video, music video, or any other topical categorization of the video), image information associated with the video (e.g., image content of the video, objects identified in the video frames, rate at which image content is changing or moving, the size/font/color of text in the video, frame rate (e.g., fps), etc.), sound information associated with the video (e.g., audio content of the video, words or other sounds identified in the audio content of the video, the dynamic range of the audio content in a video, etc.), metadata associated with the video (e.g., video title, video description, the length of the video, a preview thumbnail associated with the video, closed-caption data for the video), metadata-to-content relevance information (e.g., how well the metadata for a video and the content of the video align), creator features associated with one or more creators of the video (e.g., user features associated with a user that uploaded and/or created the video, such as demographic information of the user, creation history of the user, etc.), etc. Many variations are possible.

It may be useful to collect a relatively large set of training data for training the machine learning model. In certain embodiments, the model training module 204 can be configured to automatically collect at least some of the set of training videos for training a machine learning model. In an embodiment, the model training module 204 can be configured to automatically collect training videos from one or more pages on a social networking system. A page can be categorized or assigned to one or more verticals or sub-verticals. Such categorization or assignment can be determined by an administrator of the page networking system or by the social networking system through, for example, analysis of content posted to or transactions performed by the page. For example, the model training module 204 can be configured to identify or receive an initial set of one or more pages as a basis for collecting training videos. The model training module 204 can be configured to collect some or all videos posted by the initial set of one or more pages for inclusion in the set of training videos. In an embodiment, the model training module 204 can be configured to also identify a set of similar pages on the social networking system that have been determined to be similar to the initial set of pages. In certain instances, the set of similar pages can be identified based on a machine learning model that is trained to identify similar pages. The model training module 204 can also collect some or all of the videos posted to the social networking system by the set of similar pages for inclusion in the set of training videos. For example, to train a machine learning model to evaluate video quality for cooking videos, one or more pages on a social networking system devoted to cooking can be identified. The model training module 204 can collect some or all of the videos posted to the social networking system by the one or more pages devoted to cooking, and include those videos in a set of training videos. The model training module 204 can then also identify a set of similar pages that are similar to the one or more pages. The model training module 204 can then collect some or all videos posted by the set of similar pages for inclusion in the set of training videos as well. In this way, the disclosed technology can provide for automatic collection of training data for training a video quality machine learning model based on an initial set of input data (e.g., an initial set of pages). It can be appreciated that these features allow a user to train a machine learning model to evaluate video quality for videos pertaining to any vertical or sub-vertical based on identification of only a relatively modest number (e.g., a number that does not exceed a threshold value) of pages that pertain to that vertical or sub-vertical. In other embodiments, different selection criteria can be used for automatically identifying and selecting videos to train a machine learning model such that "custom" categories can be created for training machine learning models. For example, custom categories may be identified and/or defined based on user viewing trends or popular videos.

In various embodiments, the model training module 204 can be configured to label a set of training videos based on an identified evaluation objective and/or based on one or more video quality metrics pertaining to an identified evaluation objective. For example, as discussed above, one example of an evaluation objective may be to maximize viewer retention time. In such instances, the set of training videos can be labeled based on viewer retention time. For example, a label may be based on a range of viewer retention time values. For instance, videos in the set of training videos with an average retention time below one minute may be labeled as negative examples, while videos in the set of training videos with an average retention time equal to or above one minute may be labeled as positive examples. In certain embodiments, the model training module 204 can be configured to label a set of training videos based on a set of two or more labels. For example, as mentioned above, a video quality model may be configured to assign a video to a particular video quality category of a plurality of pre-defined video quality categories. Each of the plurality of pre-defined video quality categories may be assigned with a respective label. Each video quality category may be associated with a particular set of video quality metric requirements to be assigned to that category. For example, in the context of viewer retention time, four different quality categories could be defined, such as poor=average retention time less than 20 seconds, fair=average retention time between 20 and 40 seconds, good=average retention time between 40 and 60 seconds, excellent=average retention time greater than 60 seconds. Many variations are possible. In certain embodiments, each training video of the set of training videos can be assigned a label based on the requirements associated with each video quality category. Thus, in some embodiments, labels need not be binary. While the example evaluation objective of retention time is used here, it should be understood that the present technology can be utilized for any evaluation objective pertaining to video quality. For example, if the evaluation objective is to determine video quality based on the number of comments a video is likely to receive, the labels assigned to the set of training videos may be determined based on the number of comments each training video received, and various comment quality metric requirements associated with different video quality categories. Or, if the evaluation objective is to maximize the number of times a video is shared, the labels assigned to the set of training videos may be determined based on the number of times each training video was shared. Using the disclosed technology, for an identified evaluation objective, the model training module 204 can not only automatically generate a set of training data (i.e., a set of training videos), but can also automatically label the set of training data based on various requirements that have been defined for various labels.

In certain embodiments, once a set of training videos has been collected by the model training module 204, the set of training videos may be filtered based on filtering criteria in order to identify a set of qualified training videos. In certain embodiments, rather than labeling the entire set of training videos, the model training module 204 can label only those videos that satisfy the filtering criteria, i.e., the set of qualified training videos. In an embodiment, filtering criteria can include a threshold time filter such videos that are shorter than a threshold length are filtered out. For example, a social networking system may only monetize videos (e.g., display advertisements in videos) that are longer than a threshold length (e.g., longer than two minutes, longer than three minutes, etc.), and any videos in the set of training videos shorter than the threshold length may be filtered out. In another example embodiment, videos that have been identified as "viral" videos may be filtered out of the set of training videos. In yet another example embodiment, videos that have been identified as pornographic or otherwise deemed inappropriate may be filtered out of the set of training videos. Other types of filters can also be applied.

Once the model training module 204 has identified a set of training videos, and labeled the set of training videos or, in certain instances, identified a set of training videos, filtered the set of training videos to identify a set of qualified training videos, and then labeled the set of qualified training videos, the model training module 204 can train a machine learning model based on the labeled set of training data. As discussed above, each video in the set of training videos (and/or the set of qualified training videos) can be associated with a set of video features. The model can be trained, based on the labels and the video features, to identify which video features are most likely to result in a "high quality video" as defined by the identified evaluation objective (e.g., which video features are most likely to maximize retention time, or most likely to maximize comments on a video, or most likely to maximize sharing of a video, etc.). In certain embodiments, the machine learning model can be a two-stage cascade model. In one such embodiment, the machine learning model comprises a deep neural network cascaded with a sparse neural network. The deep neural network can be trained to receive image and sound data associated with a video, and generate an embedding (i.e., an n-dimensional vector representation) of the video. The sparse neural network model can be trained to receive other video features (e.g., video metadata, video creator features), as well as the embedding (e.g., vector representation) of the video generated by the deep neural network model, and generate a final output pertaining to video quality for a video. For example, the final output may be an overall video quality score indicative of a quality of the video (e.g., indicative of the likelihood of the video to achieve a particular video quality metric requirement). In another example, the final output may be an assignment of the video to a particular video quality category of a pre-defined set of video quality categories (e.g., poor, fair, good, excellent) indicative of a likelihood of the video to achieve an associated video quality metric requirement.

The video quality prediction module 206 can be configured to receive a video to be evaluated, and make a video quality prediction for the video based on the machine learning model trained by the model training module 204. As discussed above, the video quality prediction may be a video quality score indicative of a predicted quality of a video (e.g., a video quality score indicative of a likelihood of the video to satisfy and/or achieve a particular video quality metric requirement or goal pertaining to an identified evaluation objective). As also discussed above, the video quality prediction may be a selection of one video quality category of a pre-defined set of video quality categories indicative of a predicted quality of the video (e.g., the video quality category is indicative of a likelihood of the video to satisfy and/or achieve a particular video quality metric requirement or goal pertaining to an identified evaluation objective). For example, consider an example scenario in which a trained machine learning model is associated with an evaluation objective that is to maximize viewer retention time. Furthermore, consider that there are four pre-defined video quality categories: poor, fair, good, and excellent. As discussed above, each video quality category may be associated with a set of requirements used for labeling training data when training the machine learning model, such as poor=average retention time of less than 20 seconds, fair=average retention time of between 20 and 40 seconds, good=average retention time of between 40 and 60 seconds, excellent=average retention time of greater than 60 seconds. Classification of a video into the "poor" category by the machine learning model may indicate that the machine learning model has determined that the video is most likely to have an average retention time of less than 20 seconds, while classification of a video into the "fair" category by the machine learning model may indicate that the machine learning model has determined that the video is most likely to have an average retention time of between 20 and 40 seconds, and so forth. In an embodiment, the machine learning model may, based on an input video, generate and output a likelihood score for each video quality category of the pre-defined set of video quality categories, and may generate and output a video quality category having the highest likelihood score.

In certain embodiments, the video quality prediction module 206 can receive a video that a user intends to publish or post. The user can continue to submit different versions of the video until the user is satisfied with the video quality prediction supplied by the video quality prediction module 206 for a particular version of the video. The user can then publish and/or post the particular version of the video (e.g., to a social networking system). In this way, uncertainty about audience reception to the video can be suitably managed and reduced.

In certain embodiments, and as mentioned above, multiple machine learning models may be trained for different video-quality-related purposes. In some embodiments, different machine learning models may be trained for different video verticals or sub-verticals. In this regard, the features that make a successful cooking video, as an example, may differ from the features that make a successful basketball video, as another example. In some embodiments, different machine learning models may be trained for different evaluation objectives (e.g., one machine learning model to predict "success" or "quality" as it pertains to viewer retention time, another machine learning model to predict "quality" as it pertains to number of comments received, another machine learning model to predict "quality" as it pertains to number of times a video is shared, etc.). In certain embodiments, a machine learning model may be trained for selected combinations of verticals and evaluation objectives (e.g., a cooking/retention-time machine learning model, a cooking/comments machine learning model, a cooking/share machine learning model, a basketball/retention-time machine learning model, a basketball/comments machine learning model, a basketball/share machine learning model, etc.). The video quality prediction module 206 can be configured to receive a video to be evaluated, and provide the video to each machine learning model of a plurality of machine learning models. Each machine learning model may output a particular video quality prediction. A user can be presented with the various video quality predictions (e.g., in a user interface). For example, if a user submits a video for evaluation, the user can be presented with a first score or category for the video indicative of the video's predicted quality level as a cooking video, a second score or category for the video indicative of the video's predicted quality level as a travel video, a third score or category for the video indicative of the video's predicted quality level as a basketball video, etc.

Figure 3:
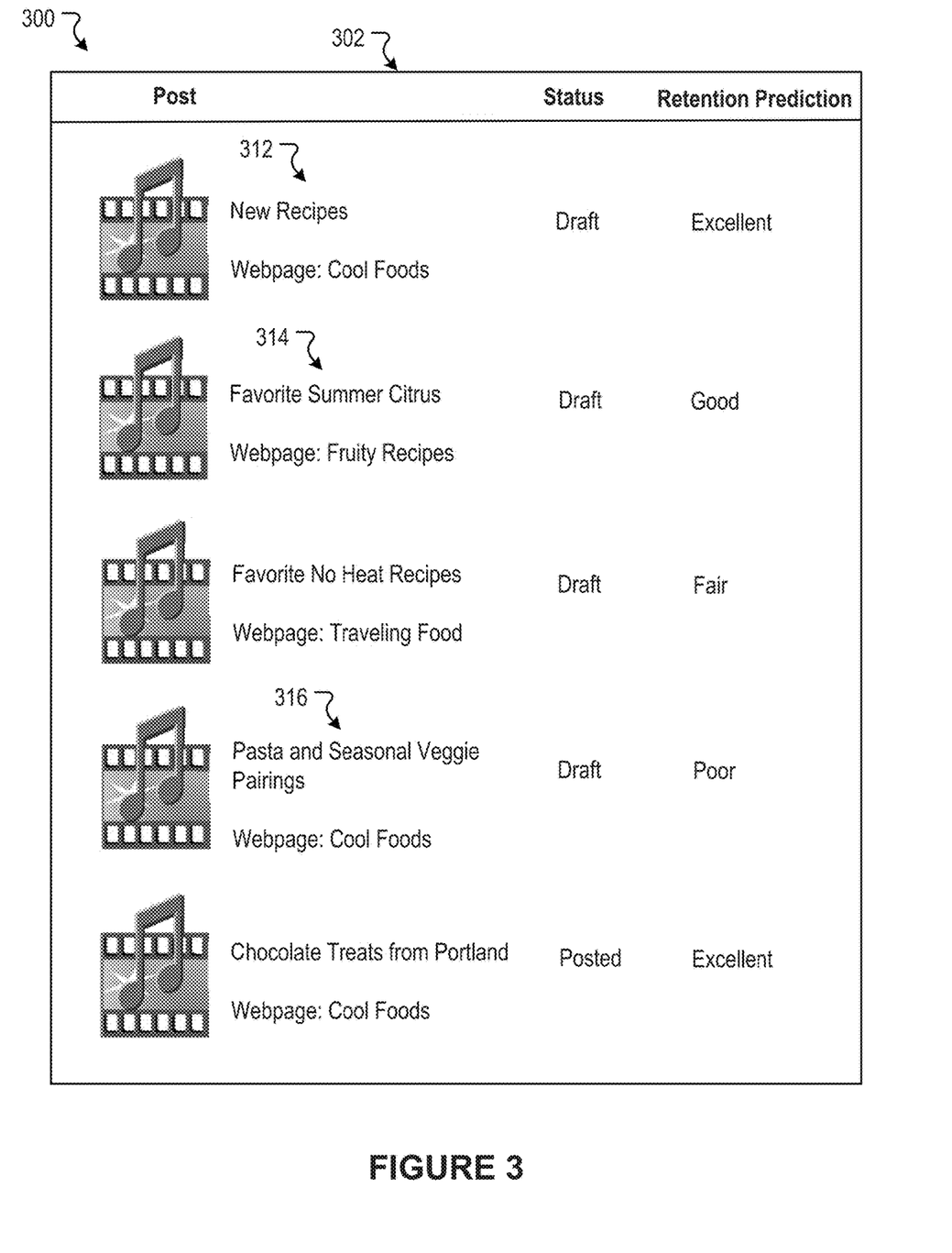
FIG. 3 illustrates an example scenario including a user interface, according to an embodiment of the present technology.

FIG. 3 illustrates an example scenario 300 including a user interface 302 that illustrates functionality of the content provider module 102, according to an embodiment of the present technology. In the example scenario 300, the user interface 302 includes a set of videos that have been submitted for evaluation by one or more suitably trained machine learning models. In the example scenario, videos are being evaluated for video quality as determined based on their likelihood to maximize viewer retention time. In other words, videos are being evaluated based on their likelihood to satisfy various video quality metric requirements or goals pertaining to viewer retention time. When a video is submitted, a prediction of the video quality may be made. The prediction determines the video quality by assigning videos into one video quality category of the following set of video quality categories: "Excellent", "Good", "Fair", and "Poor". For example, a first video 312, entitled "New Recipes," has been assigned to the "Excellent" video quality category. A second video 314, entitled "Favorite Summer Citrus," has been assigned to the "Good" video quality category. If a video, such as a video 316, entitled "Pasta and Seasonal Veggie Pairings," receives a prediction corresponding to the "Poor" video quality category, the publisher of the video can implement various edits of the video to generate multiple versions. Each version can be evaluated for video quality to allow the publisher to publish the version with the desired or highest video quality.

Figure 4:
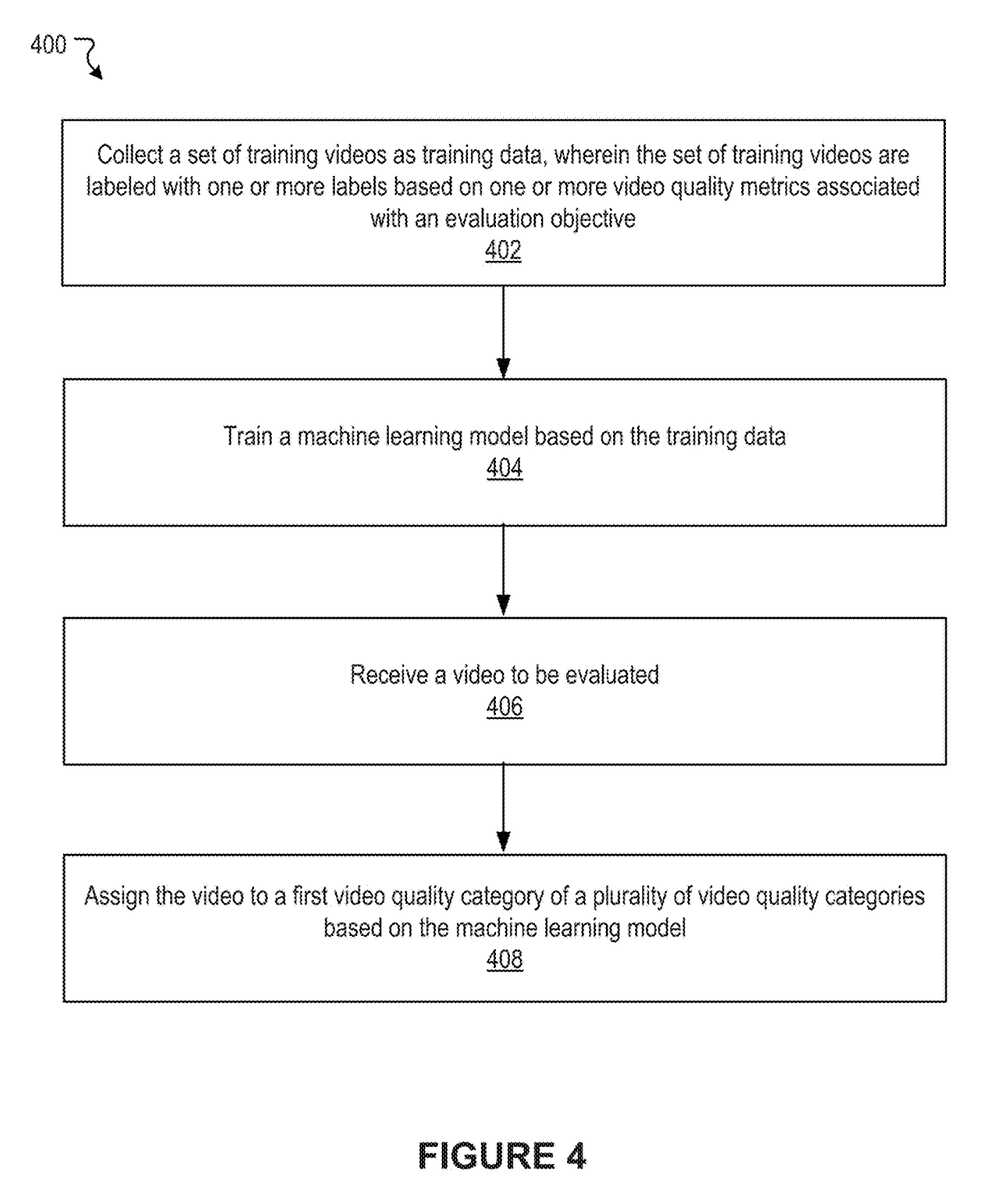
FIG. 4 illustrates an example method, according to an embodiment of the present technology.

FIG. 4 illustrates an example method 400, according to an embodiment of the present technology. It should be appreciated that there can be additional, fewer, or alternative steps performed in similar or alternative orders, or in parallel, within the scope of the various embodiments discussed herein unless otherwise stated.

At block 402, the example method 400 can collect a set of training videos as training data, wherein the set of training videos are labeled with one or more labels based on one or more video quality metrics associated with an evaluation objective. At block 404, the example method 400 can train a machine learning model based on the training data. At block 406, the example method 400 can receive a video to be evaluated. At block 406, the example method 400 can assign the video to a first video quality category of a plurality of video quality categories based on the machine learning model.

Figure 5:
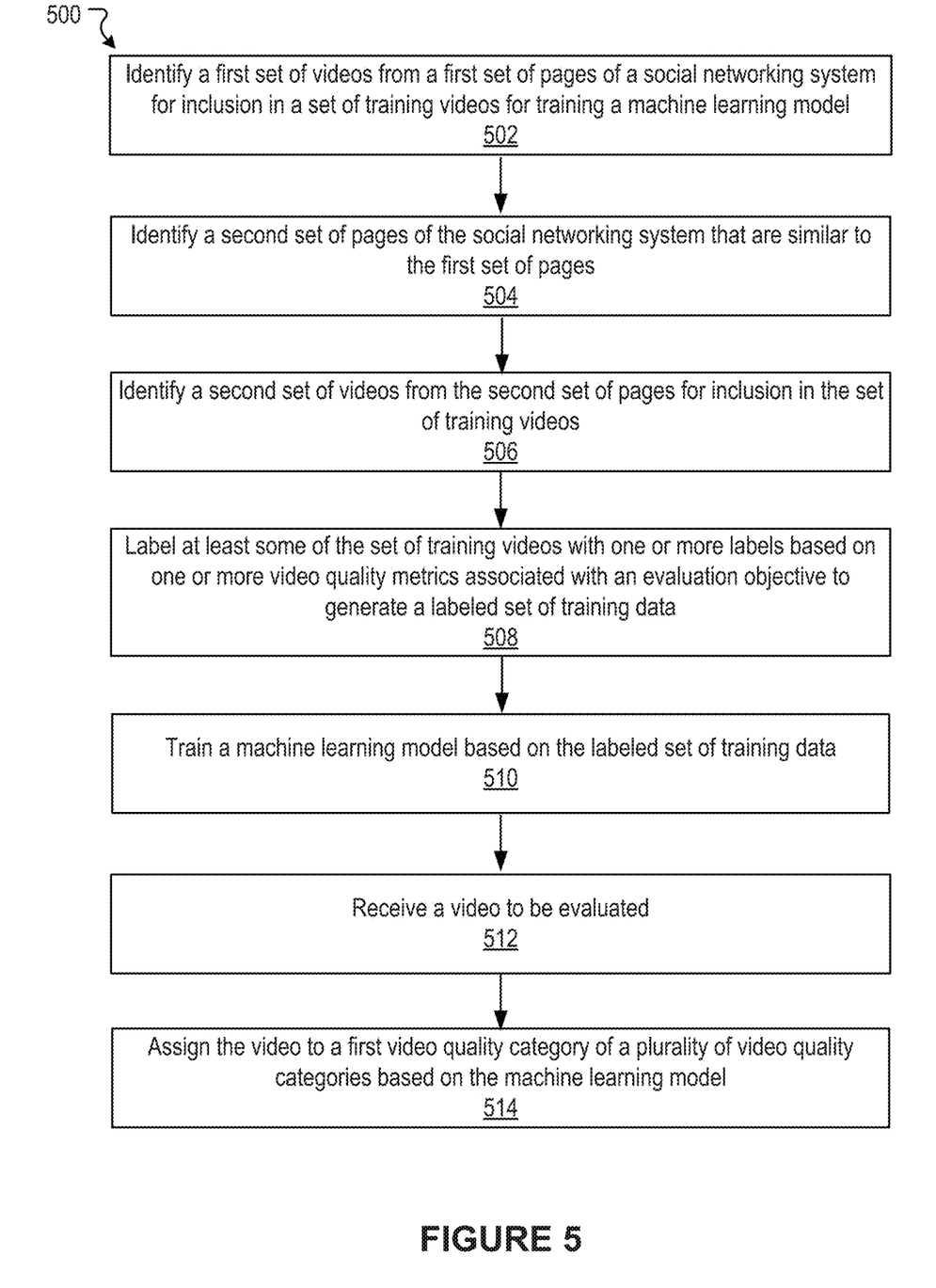
FIG. 5 illustrates another example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can identify a first set of videos from a first set of pages of a social networking system for inclusion in a set of training videos for training a machine learning model. At block 504, the example method 500 can identify a second set of pages of the social networking system that are similar to the first set of pages. At block 506, the example method 500 can identify a second set of videos from the second set of pages for inclusion in the set of training videos. At block 508, the example method 500 can label at least some of the set of training videos with one or more labels based on one or more video quality metrics associated with an evaluation objective to generate a labeled set of training data. At block 510, the example method 500 can train a machine learning model based on the labeled set of training data. At block 512, the example method 500 can receive a video to be evaluated. At block 514, the example method 500 can assign the video to a first quality category of a plurality of video quality categories based on the machine learning model.

It is contemplated that there can be many other uses, applications, and/or variations associated with the various embodiments of the present technology. For example, in some cases, users can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
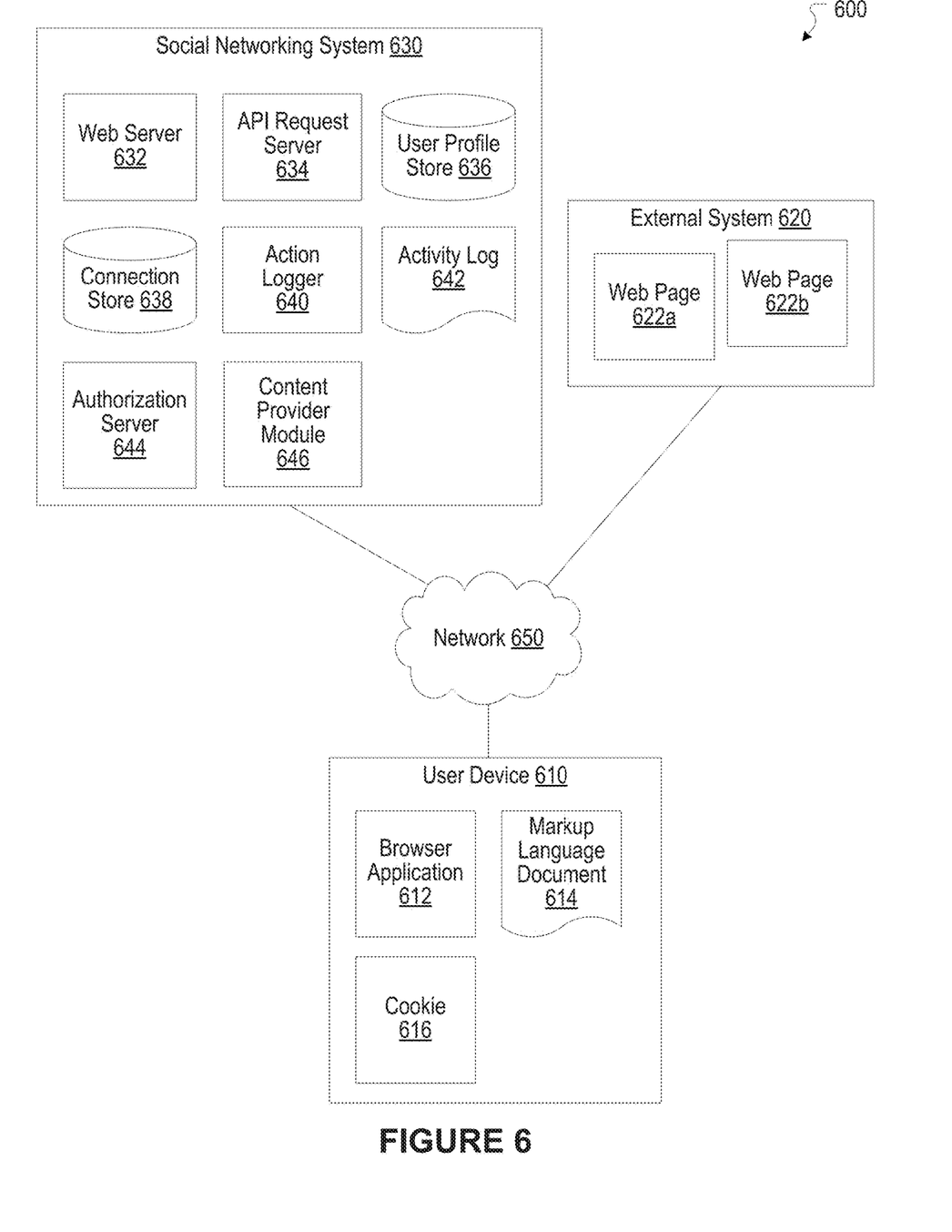
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. In some embodiments, one or more functionalities of the content provider module 646 can be implemented in the user device 610. As discussed previously, it should be appreciated that there can be many variations or other possibilities.

Hardware Implementation

Figure 7:
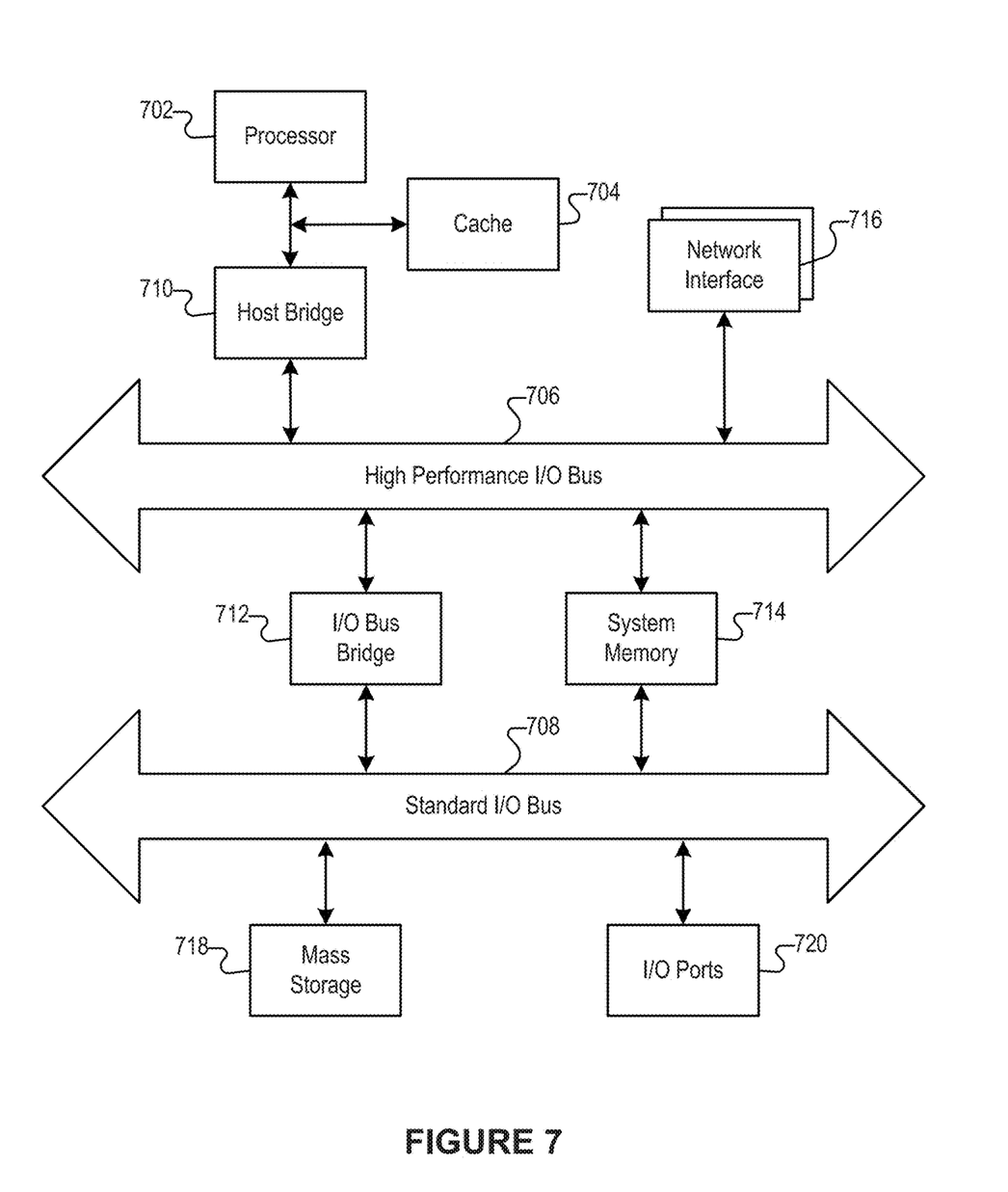
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   collecting, by a computing system, a set of training videos as training data, wherein the set of training videos are labeled with one or more labels based on one or more video quality metrics associated with an evaluation objective;
   training, by the computing system, a machine learning model based on the training data to determine a plurality of video quality categories, wherein each video quality category is associated with a respective time range;
   receiving, by the computing system, a video to be evaluated; and
   assigning, by the computing system, the video to a first video quality category of the plurality of video quality categories based on the machine learning model, wherein each video quality category of the plurality of video quality categories corresponds with a respective time range.

2. The computer-implemented method of claim 1, wherein the video quality metric pertains to viewer retention time.

3. The computer-implemented method of claim 1, wherein collecting the set of training videos comprises:
   collecting a first set of training videos from a first set of pages of a social networking system.

4. The computer-implemented method of claim 3, wherein collecting the set of training videos further comprises:
   identifying a second set of pages of the social networking system that are similar to the first set of pages, and
   collecting a second set of training videos from the second set of pages.

5. The computer-implemented method of claim 4, wherein the second set of pages are identified based on a second machine learning model.

6. The computer-implemented method of claim 1, wherein the machine learning model is a multi-stage model comprising a deep neural network and a sparse neural network.

7. The computer-implemented method of claim 6, wherein the deep neural network is configured to receive image and sound data associated with the video, and generate a vector representation of the video.

8. The computer-implemented method of claim 7, wherein the sparse neural network model is configured to receive metadata associated with the video and the vector representation of the video generated by the deep neural network, and generate respective likelihood scores corresponding to each of the plurality of video quality categories.

9. The computer-implemented method of claim 8, wherein the video is assigned to the first video quality category of the plurality of video quality categories based on the first video quality category having a highest likelihood score of the plurality of video quality categories.

10. The computer-implemented method of claim 1, wherein collecting the set of training videos comprises filtering out one or more videos from the set of training videos based on filtering criteria, wherein the filtering criteria comprise a minimum length threshold.

11. A system comprising:
at least one processor; and
a memory storing instructions that, when executed by the at least one processor, cause the system to perform a method comprising:
  collecting a set of training videos as training data, wherein the set of training videos are labeled with one or more labels based on one or more video quality metrics associated with an evaluation objective;
  training a machine learning model based on the training data to determine a plurality of video quality categories, wherein each video quality category is associated with a respective time range;
  receiving a video to be evaluated; and
  assigning the video to a first video quality category of the plurality of video quality categories based on the machine learning model, wherein each video quality category of the plurality of video quality categories corresponds with a respective time range.

12. The system of claim 11, wherein the video quality metric pertains to viewer retention time.

13. The system of claim 11, wherein collecting the set of training videos comprises: collecting a first set of training videos from a first set of pages of a social networking system.

14. The system of claim 13, wherein collecting the set of training videos further comprises:
  identifying a second set of pages of the social networking system that are similar to the first set of pages, and
  collecting a second set of training videos from the second set of pages.

15. The system of claim 14, wherein the second set of pages are identified based on a second machine learning model.

16. A non-transitory computer-readable storage medium including instructions that, when executed by at least one processor of a computing system, cause the computing system to perform a method comprising:
  collecting a set of training videos as training data, wherein the set of training videos are labeled with one or more labels based on one or more video quality metrics associated with an evaluation objective;
  training a machine learning model based on the training data to determine a plurality of video quality categories, wherein each video quality category is associated with a respective time range;
  receiving a video to be evaluated; and
  assigning the video to a first video quality category of the plurality of video quality categories based on the machine learning model, wherein each quality category of the plurality of video quality categories corresponds with a respective time range.

17. The non-transitory computer-readable storage medium of claim 16, wherein the video quality metric pertains to viewer retention time.

18. The non-transitory computer-readable storage medium of claim 16, wherein collecting the set of training videos comprises: collecting a first set of training videos from a first set of pages of a social networking system.

19. The non-transitory computer-readable storage medium of claim 18, wherein collecting the set of training videos further comprises:
  identifying a second set of pages of the social networking system that are similar to the first set of pages, and
  collecting a second set of training videos from the second set of pages.

20. The non-transitory computer-readable storage medium of claim 19, wherein the second set of pages are identified based on a second machine learning model.

* * * * *